Sept. 6, 1938.  C. G. OLSON  2,129,440
SCREW
Filed July 10, 1937
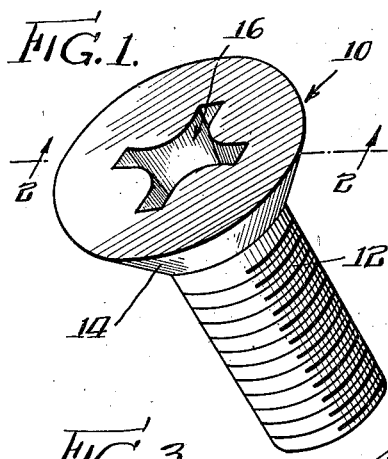
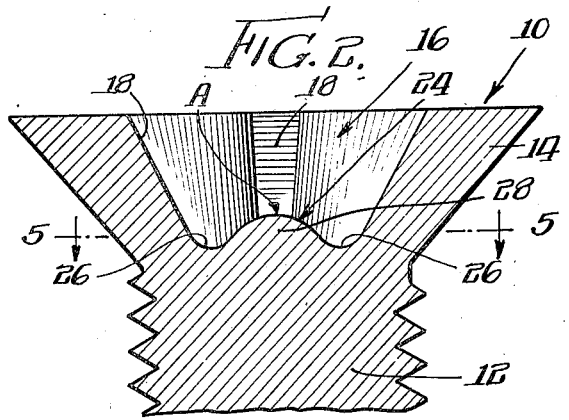
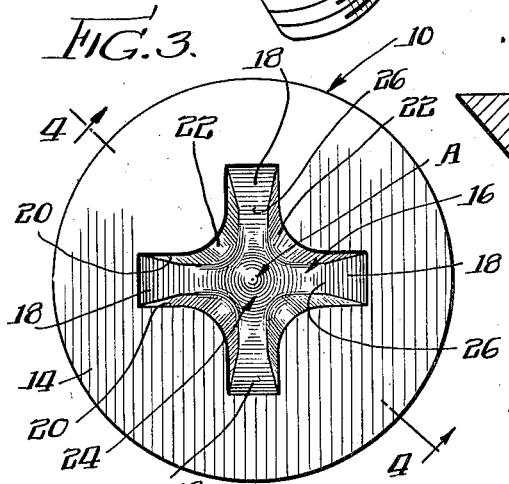
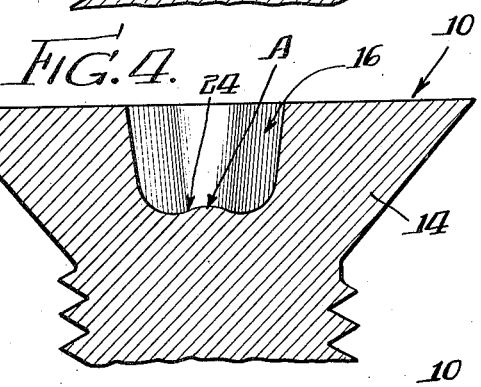
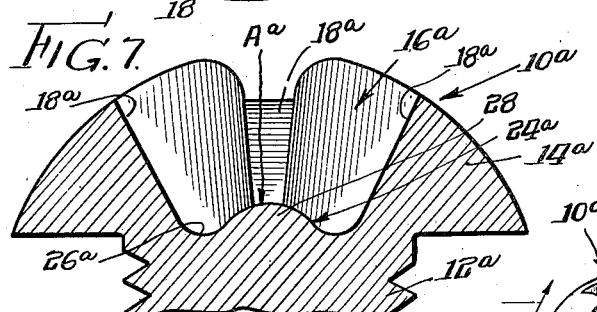
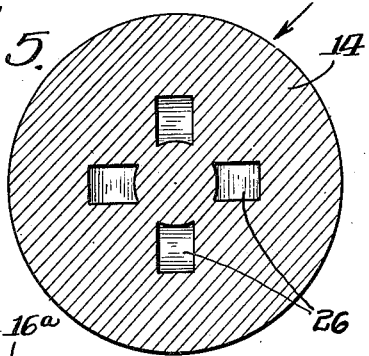
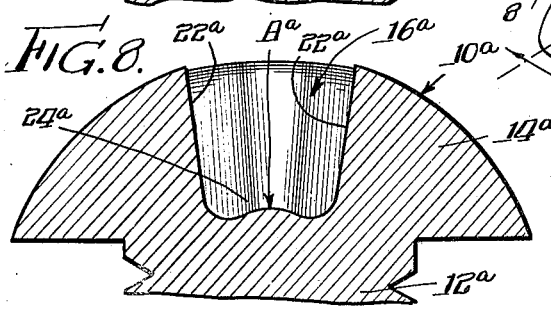
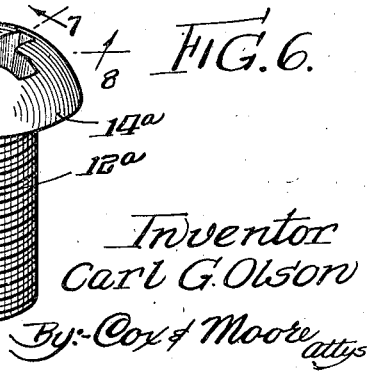
Inventor
Carl G. Olson
By: Cox & Moore attys Patented Sept. 6, 1938

2,129,440

UNITED STATES PATENT OFFICE 2,129,440

SCREW

Carl G. Olson, Chicago, Ill., assignor to Illinois Tool Works, Chicago, Ill., a corporation of Illinois Application July 10, 1937, Serial No. 152,961

8 Claims. (Cl. 85—45)

This invention relates generally to screws, and more particularly to screws provided with a novel apertured head for receiving a turning tool such as a screw driver blade.

One of the objects of the present invention is to provide a screw having a head which is apertured so as to present a novel recess of cruciform cross-section providing an effective coupling for the blades of a complementary screw driver.

The present invention contemplates a screw, as set forth above, in which the recess or aperture in the head is so disposed as to reduce to a minimum the possibility of structural weakness in the vicinity of juncture between the head and screw shank.

More specifically, the invention contemplates a cruciform recess in which the bottom portion is convex in longitudinal cross-section so as to facilitate forming the recess in the screw head and to lend strength at the points where the converging walls of the radial portions of the recess merge with the bottom of the recess.

The foregoing and numerous other objects and advantages will be more apparent from the following detailed description when considered in connection with the accompanying drawing, wherein—

Figure 1 is a perspective view of a screw having a head provided with a recess of the type contemplated by the present invention;

Figure 2 is an enlarged longitudinal cross-section of the head of the screw of Figure 1, said section being taken substantially along the line 2—2 of Figure 1;

Figure 3 is a plan view of the screw shown in Figures 1 and 2;

Figure 4 is a longitudinal sectional view of the screw taken substantially along the line 4—4 of Figure 3;

Figure 5 is a transverse sectional view taken substantially along the line 5—5 of Figure 2 to more clearly illustrate the relatively small reduction in the amount of metallic stock at the juncture of the head and the body of the screw when a recess of the type contemplated herein is provided in a screw head;

Figure 6 is a perspective view of a round headed screw provided with a cruciform recess of the type contemplated herein;

Figure 7 is an enlarged longitudinal sectional view taken substantially along the line 7—7 of Figure 6; and Figure 8 is an enlarged longitudinal sectional view taken substantially along the line 8—8 of Figure 6.

Referring now to the drawing more in detail wherein like numerals have been employed to designate similar parts throughout the various views, it will be noted that the invention contemplates a screw indicated generally by the numeral 10 in Figures 1 to 5, inclusive. This screw includes the usual threaded shank 12 and flat type head 14 formed integral therewith. The head 14 is provided with a recess of cruciform cross-section which is denoted generally by the numeral 16.

The four radial portions of the recess 16 are bounded along their outermost extremities by walls 18, which converge toward the screw axis as they extend into the body of the head. Extending inwardly from each margin of the converging walls 18 is a wall portion or section 20, and these wall sections 20 describe surfaces which incline toward each other as they extend into the body of the screw head. At any point of transverse cross-section taken perpendicular to the screw axis, the lines of cross-section on the surfaces 20 of each radial portion of the recess will be parallel to each other and perpendicular to the complementary line of cross-section on the wall 18. In other words, the side walls 20 do not diverge from each other as they extend radially inward, but do converge toward each other as they extend longitudinally into the body of the screw head.

In the disclosed embodiment the side walls 20 of each radial portion of the recess 16 merges with an arcuate wall portion 22. The foregoing wall construction is similar to the side wall arrangement disclosed in the U. S. patent to Frearson, 308,246. The present invention contemplates a recessed screw head construction which distinguishes from the cruciform recess of Frearson. In this connection particular attention is directed to the contour of the bottom surface 24. This surface 24 is convex, the highest portion of said surface being located at the point designated by the letter A, which is coincident with the axis of the screw. From the point A the surface 24 curves downwardly into the radial portions of the recess 16 and merges with curved surfaces 26 which form continuations of the wall portions 18.

Particular attention is directed to the fact that the presence of the material forming the dome 28 serves to materially strengthen the screw structure at the juncture of the screw head 14 and the threaded shank 12. It will be noted that the provision of this dome 28 permits the driving slots or radial portions of the recess 16 to enter a substantial depth, while the sections of the material between the slots terminate and integrally join with said dome at a point which is higher than the depth of the radial portions of the recess 16. This construction lends considerable strength to the screw in presenting an increase in the amount of material to withstand the driving force of a screw driver blade. The convex construction presented by the dome 28 must be clearly distinguished from a concave bottom arrangement wherein the bottom of the slots, as well as the bottom of the wall portions positioned intermediate the radial slots, extend a considerable distance downwardly into the screw head. By following the teachings of the present invention, an increase rather than a reduction in stock thickness in the vicinity of the juncture of the head and the screw body is presented, and this materially contributes toward the strength of the screw and consequently enhances its resistance to the turning forces exerted by a screw driver.

The importance of providing a strong juncture between the screw head and threaded shank will be more readily apparent when it is understood that this recessed arrangement is frequently used in self-tapping screws, namely, screws which are designed to cut their own thread in relatively hard material, such as steel, Bakelite, fiber board, etc. Such screws must be hardened in order to enable them to withstand the forces required to drive them into an unthreaded aperture of a relatively hard work piece. This is particularly true when the work piece or material is of any appreciable thickness. Hence, by maintaining an appreciable radial thickness of stock at the point where the head and threaded shank join, fracture resulting from hardening and from the actual use of the screw in metal is reduced to a minimum. In Figure 5 I have illustrated the relatively small area of stock which is displaced by reason of the presence of the radial slots at the bottom of the recess 16. This figure illustrates a section taken along the line 5—5 of Figure 2, and it will be noted that four relatively small rectangular areas represent the amount of material which is displaced. Comparing this with a similar cross-section of a screw having a recess provided with a concave bottom, it will be seen that a substantial increase in the strength of the screw, due to the presence of the additional stock, is obtained when the present invention is employed.

In Figures 6 to 8, inclusive, the application of the invention to a round headed screw is disclosed. No further explanation is deemed necessary for a clear understanding of the structural arrangement disclosed in these figures. Parts in Figures 6 to 8, inclusive, corresponding with those previously described in connection with Figures 1 to 5, inclusive, have been given corresponding numerals bearing the suffix "a".

In addition to the foregoing advantages resulting from the use of the type of recessed screw head just described, it will also be noted that, by forming the dome 28, the tool or punch used in making the recess is automatically centered. The cruciform recess 16 is provided by forcing a punch, which is a counterpart thereof, into the head of the screw. By forming this punch with a slight concavity at its entering end, the maintenance of the alinement between the punch and screw blank during the heading and recess forming operation is materially facilitated. The dome 28 forms the counterpart for the concavity in the punch and cooperates with the punch in maintaining alinement between the punch and the screw blank during the punching operation.

From the foregoing it will be apparent that my invention contemplates the provision of a recessed screw head of cruciform cross-section which is particularly adapted to withstand excessive stresses and strains resulting from the turning and tightening of a screw in the work. The increase in strength resulting from the presence of the convex bottom or dome, coupled with the fact that it facilitates the ease with which the recess may be produced in the screw head, enables the production of recessed screw heads which are far superior to those of conventional design, with which I am familiar, and makes for economy in the manufacture thereof. While the present invention discloses one type of convex bottom construction in the form of the dome 28 and its upper convex surface 24, it will be understood that the invention is not limited to the particular surface contour disclosed herein, but is capable of other modifications and changes without departing from the spirit and scope of the appended claims.

Having thus described my invention, what I claim as new and desire to secure by Letters Patent of the United States is as follows:

1. A screw provided with a screw driving tool receiving aperture of general cruciform transverse cross-section, and a projection extending into said aperture from the bottom thereof, said projection being generally convex in longitudinal cross-section.

2. A screw provided with a screw driving tool receiving recess of general cruciform transverse cross-section, the radial portions of said recess terminating at a point within said recess which is lower than the point at which the wall portions of the recess intermediate said radial portions terminate whereby to increase the strength of the juncture between the screw-head and threaded shank.

3. A screw provided with a screw driving tool receiving aperture of general cruciform configuration in cross-section transverse of the screw axis, and a projection extending into the bottom of the aperture and having a surface inclining downwardly from a central point within the aperture to the bottom of the radial arms of said aperture.

4. A screw having a head provided with a screw driving tool receiving aperture of generally cruciform configuration in cross section transverse to the screw axis, opposed side walls of each arm of the cruciform aperture converging toward each other as they extend downwardly into the screw body, other side walls of the aperture extending between adjacent ones of the first mentioned side walls, and a bottom wall into which said side walls merge, said bottom wall in longitudinal section through the radial arms of the aperture having a central portion thereof higher than the portions positioned at the bottom of the radial arms of the aperture.

5. A screw provided with a screw driving tool receiving recess of general cruciform transverse cross-section, opposed side walls of the radial portions of said recess converging toward each other as they extend downwardly into the screw body, the side wall of one radial portion and the side wall of the next adjacent radial portion merging with a curved wall, and a bottom wall with which said walls merge, said bottom wall in longitudinal cross-section through a radial portion of the recess having the central portion thereof higher than the portions positioned at the bottom of the radial portions of the recess.

6. A screw having a head provided with a tool receiving aperture defined by a plurality of intersecting grooves each having opposed side walls and a bottom wall, the side walls of each groove sloping in opposite directions but forming parallel lines of intersection with the upper surface of the screw head, the bottom wall of each groove sloping downwardly from the surface of the screw head toward the axis of the screw, and a convex projection extending into the tool receiving aperture at the bottom of the zone of intersection of said plurality of grooves.

7. A screw having a head provided with a tool receiving aperture defined by a plurality of intersecting grooves each having opposed side walls and a bottom wall, the side walls of each groove sloping in opposite directions but forming parallel lines of intersection with the upper surface of the screw head, the bottom wall of each groove sloping downwardly from the surface of the screw head toward the axis of the screw, and a convex projection extending into the tool receiving aperture at the bottom of the zone of intersection of said plurality of grooves, the diameter of the base of said convex projection being greater than the width of said grooves whereby to form with the bottom and side walls of said plurality of grooves spaced apart, non-intersecting recesses about said projection.

8. A screw having a head provided with a tool receiving aperture defined by a plurality of intersecting grooves each having opposed side walls and a bottom wall, the side walls of each groove sloping in opposite directions but forming parallel lines of intersection with the upper surface of the screw head, the bottom wall of each groove extending from a point in the surface of the screw head spaced inwardly of the edge thereof downwardly toward the axis of the screw, and a convex projection extending into the tool receiving aperture at the bottom of the zone of intersection of said plurality of grooves.

CARL G. OLSON.